United States Patent [19]
Minieri

[11] 3,890,270
[45] June 17, 1975

[54] POLYVINYL HALIDE RESIN COMPOSITIONS

[75] Inventor: Pasquale P. Minieri, Woodside, N.Y.

[73] Assignee: Tenneco Chemicals, Inc., Saddle Brook, N.J.

[22] Filed: Apr. 10, 1974

[21] Appl. No.: 459,812

[52] U.S. Cl. .................................. 260/45.8 N
[51] Int. Cl. .................................. C08f 45/60
[58] Field of Search ............ 260/45.8 N, 326.5 FM

[56] References Cited
UNITED STATES PATENTS

| | | | |
|---|---|---|---|
| 2,205,558 | 6/1940 | Flett | 260/326.5 |
| 2,462,835 | 3/1949 | Arnold et al. | 260/326.5 |
| 2,726,981 | 12/1955 | Wolf et al. | 260/326.5 |
| 2,795,589 | 6/1957 | Bluestone | 260/45.8 |
| 3,098,002 | 7/1963 | Riddell et al. | 106/15 |
| 3,098,003 | 7/1963 | Riddell | 106/15 |
| 3,371,063 | 2/1968 | Girard | 260/45.8 |

FOREIGN PATENTS OR APPLICATIONS 852,634   10/1960   United Kingdom

OTHER PUBLICATIONS

Chem. Abs., Neth. Appl. 6,412,267, Vol. 63, 1965, 16554 H to 16555 A.

*Primary Examiner*—M. J. Welsh
*Attorney, Agent, or Firm*—Evelyn Berlow

[57] ABSTRACT

Vinyl halide resin compositions that are resistant to attack by fungi and bacteria contain 0.01 to 2 percent by weight of a compound having the structural formula

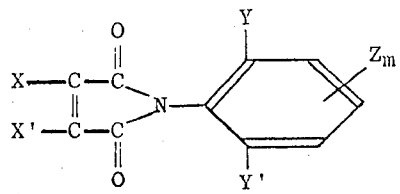

wherein X and X' each represents hydrogen or halogen; Y and Y' each represents alkyl of 1 to 4 carbon atoms, alkoxy of 1 to 4 carbon atoms, halogen, nitro, or benzyl; Z represents alkyl of 1 to 4 carbon atoms, halogen, or nitro; and $m$ represents a number in the range of 0 to 3. Illustrative of these compounds are N-2,6-diisopropylphenylmaleimide and N-(2-methyl-6-chlorophenyl)maleimide.

19 Claims, No Drawings

POLYVINYL HALIDE RESIN COMPOSITIONS

This invention relates to polyvinyl halide resin compositions having improved resistance to deterioration resulting from attack by bacteria, fungi, and other microorganisms. More particularly, it relates to polyvinyl halide resin compositions that contain a biocidally-effective amount of an N-(2,6-di-substituted-phenyl)maleimide.

Polyvinyl halide resin compositions have found many useful applications because of their wide range of elastomeric and mechanical properties coupled with their good resistance to oxidation, to organic solvents, and to alkalies. These compositions are widely used as free or unsupported films or sheets, as extruded or molded products, as coatings for various textiles, and in other forms.

The polyvinyl halide resin compositions frequently contain as plasticizers, stabilizers, or lubricants materials that have their origin in animal or vegetable sources and that render the compositions susceptible to deteriorating attack by fungi, bacteria, and other microorganisms. Microbiological deterioration of plasticized polyvinyl halide resin compositions may be manifested as surface growth which imparts an unattractive appearance to the product and/or as a change in the physical and mechanical properties of the compositions.

Plasticized polyvinyl halide resin compositions are often fabricated into films or molded articles that are exposed to environmental conditions that are conducive to microbial growth. While such conditions may be encountered in both indoor and outdoor applications, the outdoor environment presents the greater opportunity for microbial growth on plasticized polyvinyl halide resin compositions. It is therefore desirable to incorporate into such compositions biocidal compounds that protect them from microbial attack even after prolonged exposure to sunlight, heat, and rainfall.

A number of biocidal compounds have been used to protect polyvinyl halide resin compositions from attack by fungi, bacteria, and other microorganisms, but none has proven to be completely satisfactory. Some of the known biocides are insufficiently compatible with polyvinyl halides, and, when used in the amounts necessary to prevent microbial growth, they crystallize or bloom on the surface of the compositions thereby rendering them unfit for use. Other biocides are compatible with the resin and provide adequate protection against microbial growth, but they darken or otherwise deteriorate when they are subjected to heat during processing or to subsequent heating of the finished product. Some biocidal compounds, such as 10,10'-oxybisphenoxyarsine and N-trichloromethylthiophthalimide, possess the required combination of biocidal activity and heat stability, but they rapidly lose their biocidal activity upon exposure to weathering condition.

This invention relates to a new class of biocides for use in polyvinyl halide resin compositions. These compounds, which provide excellent resistance to attack by microorganisms that is retained after prolonged weathering, are compatible with polyvinyl halide compositions, do not impart color to the compositions, and have excellent heat stability.

The biocidal compounds of this invention are N-(2,6-di-substituted-phenyl)maleimides that have the structural formula

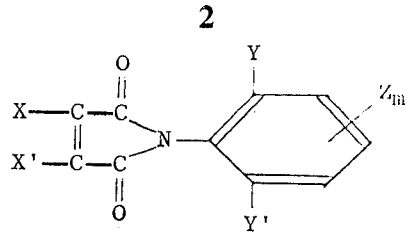

wherein X and X' each represents hydrogen or halogen; Y and Y' each represents alkyl of 1 to 4 carbon atoms, alkoxy of 1 to 4 carbon atoms, halogen, nitro, or benzyl; Z represents alkyl of 1 to 4 carbon atoms, halogen, or nitro; and $m$ represents a number in the range of 0 to 3. Illustrative of these biocidal compounds are the following: N-2,6-dimethylphenylmaleimide, N-2,6-diisopropylphenylmaleimide, N-2,4,6-tri-tert.butyl-phenylmaleimide, N-2,3,4,5,6-pentamethylphenyl-maleimide, N-(2-methyl-6-chlorophenyl)-maleimide, N-2,6-dichlorophenylmaleimide, N-2,3,5,6-tetra-chlorophenylmaleimide, N-2,6-diiodophenyl-α-iodomaleimide, N-(2-nitro-6-benzylphenyl)maleimide, N-2,6-dibenzylphenylmaleimide, N-(2,6-diethoxy-4-nitrophenyl)maleimide, N-(2,4-dibromo-6-methylphenyl)-maleimide, N-(2-methyl-6-benzylphenyl)-α, α-dichloromaleimide, N-(2,6-dinitro-3-methylphenyl)maleimide, N-(2,6-dichloro-3,4-dinitrophenyl)maleimide, N-(2,6-diethyl-3-nitrophenyl)maleimide, and N-(2-nitro-6-butylphenyl)maleimide.

Preferred as biocides in polyvinyl halide resin compositions are the compounds having the structural formula

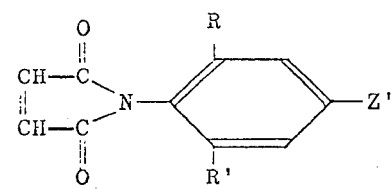

wherein R and R' each represents alkyl of 1 to 4 carbon atoms, chlorine, or bromine and Z' represents hydrogen, alkyl of 1 to 4 carbon atoms, chlorine, or bromine. The following are examples of the preferred compounds: N-2,6-dimethylphenylmaleimide, N-(2-methyl-6-ethylphenyl)maleimide, N-(2-methyl-6-chlorophenyl)-maleimide, N-2,6-diisopropylphenyl-maleimide, N-2,6-dichlorophenylmaleimide, N-(2,4-dibromo-6-methylphenyl)maleimide, N-(2,6-diethyl-4-bromophenyl)maleimide, N-2,4,6-trimethylphenyl-maleimide, N-2,4,6-tribromophenylmaleimide, N-(2,6-dichloro-4-butylphenyl)-maleimide, and N-(2,6-dibromo-4-chlorophenyl)maleimide. Particularly advantageous results have been obtained using as the biocidal compound in polyvinyl halide resin compositions one of the following compounds: N-(2-methyl-6-ethylphenyl)maleimide, N-2,6-diisopropylphenylmaleimide, N-(2-methyl-6-chlorophenyl)maleimide, N-(2,6-diethyl-4-bromophenyl)maleimide, N-(2,4-dibromo-6-methylphenyl)maleimide, and N-2,4,6-trimethyl-phenylmaleimide. A single N-(2,6-di-substituted-phenyl)maleimide or a mixture of two or more of these compounds can be used in the vinyl halide resin compositions of this invention.

The N-(2,6-di-substituted-phenyl)maleimides may be prepared by reacting maleic anhydride or a halomaleic anhydride with a 2,6-di-substituted-aniline to form a 2,6-di-substituted-maleanilic acid and reacting the 2,6-di-substituted-maleanilic acid with acetic anhydride and sodium acetate to obtain the N-(2,6-di-substituted-phenyl)maleimide. These reactions are shown in the following equations:

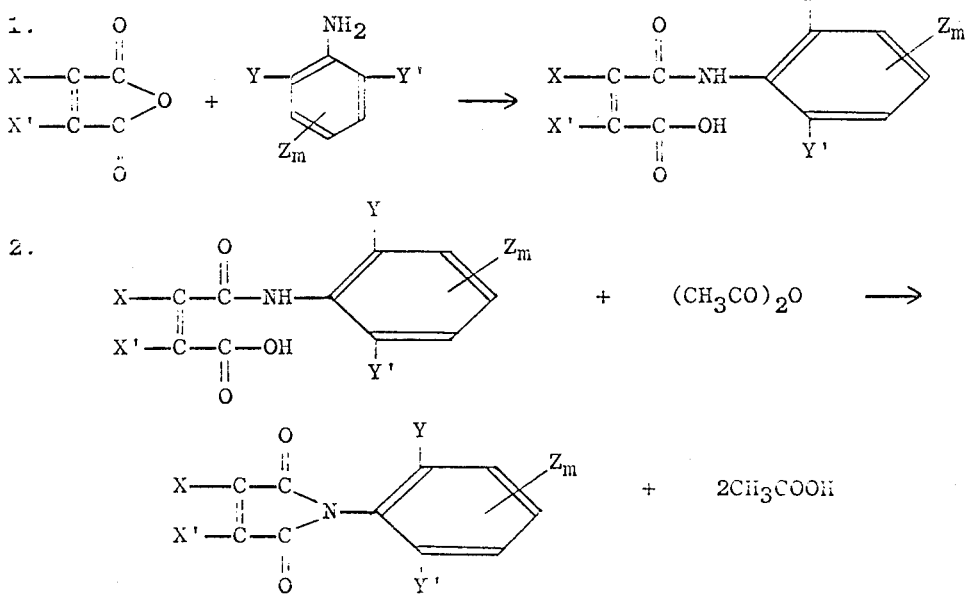

The reaction described in Equation 1 is generally carried out at ambient temperature in solution in an organic solvent, such as diethyl ether or diisopropyl ether, while that described in Equation 2 is carried out at a temperature in the range of about 40° to 95°C.

The biocidal compounds may be added as such to the vinyl halide resin composition, or a solution containing from 0.5 to 5 percent by weight of the N-substituted phenylmaleimide in a suitable solvent, for example, an alcohol, benzene, or an ester, such as dioctyl phthalate may be added to it. Alternatively, a solution of the N-(2,6-di-substituted-phenyl)maleimide may be applied to the surface of the resin.

The novel vinyl halide resin compositions may be prepared by conventional procedures. For example, when the product is desired in film or sheet form, the polyvinyl halide resin, biocidal compound, plasticizer, and other ingredients, if any, may be mixed with or without the aid of a volatile solvent and milled at an elevated temperature until the composition is homogeneous. It may then be removed from the mill in the form of sheets or film of the desired thickness. When the vinyl halide resin composition is to be used as a plastisol, the ingredients are merely mixed at ambient temperature until a homogeneous composition is obtained. This composition may then be formed or applied to a surface by such methods as knife-spreading, brushing, roller coating, dipping, molding, and the like.

To attain the desired degree of resistance to attack by fungi, bacteria, and other microorganisms, the vinyl halide resin composition should contain at least 0.01 percent and preferably 0.25 to 1.5 percent of the N-(2,6-di-substituted-phenyl)-maleimide, based on the weight of the composition. Amounts larger than 2 percent may be used, but these larger amounts generally do not provide further improvement in the properties of the resinous compositions. The amount of biocide that will provide optimum protection for the resinous composition depends upon such factors as the choice of biocide, the choice of plasticizers and stabilizers and the amounts of each used, and the application for which the composition is intended.

The vinyl halide resins that may be present in the compositions of this invention are the resinous products obtained by the polymerization of a vinyl halide in the presence or absence of a copolymerizable monomer. The term "vinyl halide resin" as used herein includes vinyl halide homopolymers, such as polyvinyl chloride and polyvinylidene chloride, as well as vinyl halide copolymers including those formed by the polymerization of a vinyl halide with a comonomer, such as vinyl acetate, vinyl propionate, vinyl butyrate, vinylidene chloride, styrene, methyl methacrylate, dialkyl fumarate or maleate, and the like. The vinyl halide is ordinarily and preferably the chloride, but the bromide and fluoride may also be used. The copolymers contain at least 70 percent of vinyl halide units and up to 30 percent of the comonomer units.

In addition to the vinyl halide resin and stabilizer, the compositions contain a plasticizer, such as dioctyl phthalate, dibutyl sebacate, tricresyl phosphate, and octyl diphenyl phosphate, or a mixture of plasticizers in the amount of about 5 to 100 parts of plasticizer per 100 parts of the resin. Other resin additives, for example, heat and light stabilizers, pigments, fillers, extenders, and solvents, may be present in the amounts ordinarily employed for the purposes indicated.

The invention is further illustrated by the following examples. In these examples, all parts are parts by weight and all percentages are percentages by weight.

EXAMPLE 1

A mixture of 196 grams (2 moles) of maleic anhydride and 2.5 liters of diisopropyl ether was stirred until a clear solution was obtained. To the solution was added a solution of 2 moles of 2,6-diisopropylaniline in 200 ml. of diisopropyl ether. The resulting suspension was stirred at ambient temperature for 1 hour, cooled to 15°–20°C., and filtered.

The 2,6-diisopropylmaleanilic acid obtained was added to a mixture of 670 ml. of acetic anhydride and 65 grams of anhydrous sodium acetate. The resulting suspension was stirred and heated on a steam bath for 30 minutes, cooled to 30°C., and then poured into 1.3 liters of ice water. The precipitated product was separated by filtration, washed with three 500 ml. portions of ice water and then with 500 ml. of petroleum ether (b.p. 30°–60°C.) and dried. The N-2,6-diisopropylphenylmaleimide obtained melted at 91°–94°C. and contained 74.2% C, 6.84% H, and 5.48% N (calculated for $C_{16}H_{19}NO_2$, 74.6% C, 7.4% H, and 5.44% N).

EXAMPLE 2

Using the procedure described in Example 1, a series of N-(2,6-di-substituted-phenyl)maleimides was prepared from the appropriate 2,6-di-substituted-aniline and maleic anhydride or a chloromaleic anhydride. The compounds prepared and their analyses are set forth in Table I.

test, the plates are incubated at 30°C. for 5 days; in the antibacterial test, the plates are incubated at 37°C. for 24 hours. The plates are then examined for zones of inhibited growth of the test microorganism.

The resistance of the compositions to surface fungal growth was determined using a modification of ASTM Method D–1924-63 (Determining Resistance of Plastics to Fungi) in which both single fungi and a mixed inoculum were used. Observations, which were made after incubation for 3 weeks at 30°C. at 85–95 percent relative humidity indicated the amount of fungal growth on the surface of the test specimens.

The results obtained in these tests are summarized in Table II. In this table

ZO = Zone of inhibition in mm.
0 = No zone of inhibition
— = Not tested

Table I

| Ex. No. | Compound | Melting Range (°C.) | % C (theo.) | % H (theo.) | % N (theo.) | % Halogen (theo.) |
|---|---|---|---|---|---|---|
| 2A | N-2,6-Dimethylphenylmaleimide | 92–98 | 72.3 (71.7) | 5.56 (5.47) | 6.87 (6.98) | — — |
| 2B | N-(2-Methyl-6-ethylphenyl)-maleimide | 60–63 | 72.0 (72.4) | 5.84 (6.03) | 6.51 (6.51) | — — |
| 2C | N-(2-Methyl-6-chlorophenyl)-maleimide | 57–61 | 59.6 (59.7) | 3.50 (3.61) | 6.22 (6.33) | 16.1 (16.0) |
| 2D | N-2,6-Diethylphenylmaleimide | 67–69 | 74.1 (73.3) | 6.55 (6.55) | 6.16 (6.11) | — — |
| 2E | N-2,6-Dichlorophenylmaleimide | 108–115 | 49.5 (49.6) | 2.06 (2.07) | 5.71 (5.78) | 28.8 (29.3) |
| 2F | N-(2,6-Diethyl-4-bromophenyl)-maleimide | 96–100 | 56.0 (57.6) | 4.45 (4.78) | 4.73 (4.78) | 26.1 (27.3) |
| 2G | N-(2,4-Dibromo-6-methylphenyl)-maleimide | 88–93 | 37.6 (38.4) | 2.42 (2.03) | 4.01 (4.07) | 46.3 (46.5) |
| 2H | N-2,6-Diethylphenyl-α-chloro-maleimide | 72–83 | 67.3 (66.7)* | 5.75 (5.28)* | 5.53 (5.56)* | — |
| 2I | N-2,6-Diethylphenyl-α,α-dichloromaleimide | 72–83 | 56.7 (56.3) | 4.26 (4.37) | 4.72 (4.68) | — |
| 2J | N-2,4,6-Trimethylphenylmaleimide | 100–104 | 72.8 (72.6) | 7.08 (6.04) | 6.40 (6.50) | — |

*Calculated for $C_{14}H_{13.3}Cl_{0.7}NO_2$

EXAMPLE 3

A polyvinyl chloride composition, typical of the formulations into which the N-(2,6-di-substituted-phenyl)maleimides can be incorporated, was prepared by mixing together the following ingredients:

| | Parts |
|---|---|
| Polyvinyl chloride | 100 |
| Dioctyl phthalate | 35 |
| Dioctyl adipate | 20 |
| Epoxidized soybean oil | 5 |
| Barium/cadmium/zinc stabilizer (Nuostabe V-1515) | 3 |
| Titanium Dioxide | 1 |
| Biocidal compound | 1.64 |

The mixtures were mixed thoroughly for 4 hours on a rolling mill. Portions of the resulting plastisols were placed in glass molds and cured at 375°F. for 5 minutes to form test specimens that were 16 mm. in diameter and 3 mm. thick.

The antifungal and antibacterial properties of the test specimens was determined using the Agar Seed Plate Method. In this test, the specimens are placed on the surface of solidified agar plates that have been inoculated with the test microorganism. In the antifungal Bacteria
A = *Pseudomonas aeruginosa*
B = *Bacillus subtilis*
C = *Staphylococcus aureus*
D = *Streptoverticulum reticulum*

Fungi
1 = *Trichoderma sp.*
2 = *Penicillium funiculosum*
3 = *Aspergillus niger*
4 = Mixed fungi

EXAMPLE 4

A polyvinyl chloride resin composition was prepared by blending 100 parts of polyvinyl chloride (Tenneco PVC 250) with 35 parts of dioctyl phthalate, 20 parts of dioctyl adipate, 5 parts of epoxidized soybean oil, 3 parts of a barium/cadmium/zinc stabilizer, 0.5 part of stearic acid, 5 parts of blue pigment, and small amounts of an N-(2,6-di-substituted-phenyl)maleimide or a comparative biocide. The biocides were added as 1 percent solutions in dioctyl phthalate. The mixture was charged to a two-roll, steam-heated differential speed mill whose surface temperature was maintained at 325°–335°F. It was milled for 5 minutes and then removed from the rolls as a sheet 40 mils thick. The films were cut into 7 × 3 inch strips.

Table II

Antimicrobial Evaluation of Plastisol Compositions Containing 1% by Weight of N-(2,6-di-substituted-phenyl)maleimides

| Biocide | Compatibility in Plastisol | Bacteria A | Bacteria B | Bacteria C | Biocidal Activity D | Fungi 1 | Fungi 2 | Fungi 3 | Fungi 4 | Surface Fungal Growth |
|---|---|---|---|---|---|---|---|---|---|---|
| N-2,6-Dimethylphenyl-maleimide | Excellent | ZO-1 | ZO-9 | ZO-8 | ZO-15 | ZO-8 | ZO-14 | ZO-6 | ZO-5 | None |
| N-(2-Methyl-6-ethyl-phenylmaleimide | " | ZO-1 | ZO-4 | ZO-6 | ZO-15 | ZO-5 | ZO-11 | ZO-4 | ZO-4 | " |
| N-2,6-Diethylphenyl-maleimide | " | ZO-1 | ZO-6 | ZO-6 | ZO-15 | ZO-3 | ZO-10 | ZO-3 | ZO-3 | " |
| N-2,6-Diisopropyl-phenylmaleimide | " | 0 | ZO-2 | ZO-3 | ZO-15 | 0 | ZO-2 | ZO-1 | ZO-1 | " |
| N-(2-Methyl-6-chloro-phenyl)maleimide | Good | ZO-1 | ZO-7 | ZO-7 | ZO-15 | ZO-3 | ZO-12 | ZO-5 | ZO-4 | " |
| None | — | 0 | 0 | 0 | 0 | 0 | 0 | 0 | 0 | Heavy growth |
| N-Trichloromethyl-thiophthalimide | Excellent | 0 | ZO-1 | ZO-2 | — | 0 | ZO-5 | ZO-1 | 0 | None |
| 10,10'-Oxybisphenoxy- | " | ZO-1 | ZO-8 | ZO-4 | — | ZO-3 | ZO-13 | ZO-6 | ZO-5 | " |

The strips of the compositions containing the N-(2,6-di-substituted-phenyl)maleimides or the comparative biocides were placed in an Atlas Weather-O-Meter, where they were subjected to a weathering cycle consisting of 102 minutes exposure to ultraviolet light followed by 18 minutes exposure to water spray and ultraviolet light for a total of either 100 hours or 200 hours.

Antimicrobial evaluation and surface fungal resistance determination of specimens of the weathered and unweathered compositions were carried out by the procedures described in Example 3. The results obtained in the antimicrobial evaluation are summarized in Table III. In this table
ZO = Zone of inhibition in mm.
Tr = Trace zone of inhibition
0 = No zone of inhibition
— = Not tested Bacteria
  B = *Bacillus subtilis*
  C = *Staphylococcus aureus*
Fungi
  2 = *Penicillium funiculosum*. The results obtained in the surface fungal resistance determination are summarized in Table IV. The results, which were observed at four weekly intervals, are reported according to the following scale:
ZO = Zone of inhibition
0 = No growth on surface
Tr = Trace of growth on surface
1 = Less than 10% growth on surface
2 = 10–30% growth on surface
3 = 30–60% growth on surface
4 = Greater than 60% growth on surface
— = Not tested

Table III

Antimicrobial Evaluation of Weathered and Unweathered Films of Polyvinyl Chloride Compositions Containing N-(2,6-Di-substituted-phenyl)maleimides

| Biocide | Test Level* | Bacteria B Weathered (Hrs.) 0 | 100 | 200 | Bacteria C Weathered (Hrs.) 0 | 100 | 200 | Fungi 2 Weathered (Hrs.) 0 | 100 | 200 |
|---|---|---|---|---|---|---|---|---|---|---|
| N-2,6-Dimethylphenyl-maleimide | 0.1 | ZO-1 | Tr | ZO-1 | ZO-1 | Tr | Tr | 0 | 0 | 0 |
|  | 0.2 | ZO-3 | ZO-1 | ZO-2 | ZO-2 | ZO-1 | ZO-1 | Tr | 0 | 0 |
|  | 0.5 | ZO-4 | ZO-2 | ZO-2 | ZO-3 | ZO-4 | ZO-2 | ZO-3 | ZO-2 | Tr |
| N-(2-Methyl-6-ethyl-phenyl)maleimide | 0.1 | ZO-1 | 0 | 0 | Tr | 0 | 0 | 0 | 0 | — |
|  | 0.2 | ZO-2 | ZO-1 | ZO-1 | ZO-1 | Tr | 0 | Tr | 0 | 0 |
|  | 0.5 | ZO-3 | ZO-3 | ZO-2 | ZO-2 | ZO-2 | ZO-2 | ZO-3 | ZO-1 | Tr |
| N-2,6-Diisopropyl-phenylmaleimide | 0.1 | 0 | 0 | — | 0 | 0 | — | 0 | 0 | — |
|  | 0.2 | Tr | Tr | — | Tr | 0 | — | 0 | 0 | — |
|  | 0.5 | ZO-2 | ZO-1 | Tr | ZO-1 | Tr | 0 | 0 | 0 | 0 |
| N-(2-Methyl-6-chloro-phenyl)maleimide | 0.1 | ZO-1 | Tr | Tr | ZO-1 | Tr | Tr | 0 | 0 | 0 |
|  | 0.2 | ZO-2 | ZO-1 | ZO-1 | ZO-1 | ZO-1 | ZO-1 | Tr | 0 | 0 |
|  | 0.5 | ZO-3 | ZO-2 | ZO-2 | ZO-2 | ZO-2 | ZO-2 | ZO-2 | ZO-1 | Tr |
| N-2,6-Diethylphenyl-maleimide | 0.1 | ZO-1 | 0 | 0 | Tr | 0 | 0 | 0 | 0 | — |
|  | 0.2 | ZO-1 | ZO-1 | Tr | Tr | Tr | Tr | Tr | 0 | Tr |
|  | 0.5 | ZO-2 | ZO-2 | ZO-2 | ZO-1 | ZO-1 | ZO-1 | ZO-2 | Tr | — |
| N-2,6-Dichlorophenyl-maleimide | 0.2 | ZO-2 | ZO-1 | Tr | ZO-1 | ZO-2 | ZO-1 | Tr | 0 | 0 |
|  | 0.3 | ZO-2 | ZO-2 | ZO-1 | ZO-2 | ZO-2 | ZO-2 | ZO-1 | Tr | 0 |
| N-Trichloromethyl-thiophthalimide | 0.1 | 0 | Tr | 0 | 0 | 0 | 0 | 0 | 0 | 0 |
|  | 0.2 | 0 | 0 | 0 | 0 | 0 | 0 | Tr | Tr | 0 |
|  | 0.5 | ZO-1 | 0 | 0 | Tr | Tr | 0 | ZO-1 | Tr | Tr |
| 10,10'-Oxybisphenoxy-arsine | 0.05 | ZO-5 | ZO-2 | ZO-1 | ZO-2 | ZO-2 | Tr | ZO-8 | ZO-5 | ZO-1 |
|  | 0.083 | ZO-6 | ZO-4 | ZO-2 | ZO-3 | ZO-3 | Tr | ZO-9 | ZO-7 | ZO-2 |

*%Biocide based on total weight of plasticizer

Table IV

Surface Fungal Growth on Weathered and Unweathered Films of Polyvinyl Chloride Compositions Containing N-(2,6-Di-substituted-phenyl)maleimides

| Biocide | Product of Ex. 2A | | | Product of Ex. 2B | | | Product of Ex. 1 | | | Product of Ex. 2C | | | Product of Ex. 2D | | | N-Trichloromethylthiophthalimide | | | 10,10'-Oxybisphenoxyarsine |
|---|---|---|---|---|---|---|---|---|---|---|---|---|---|---|---|---|---|---|---|
| Test Level (% biocide based on total weight of plasticizer) | 0.1 | 0.2 | 0.5 | 0.1 | 0.2 | 0.5 | 0.1 | 0.2 | 0.5 | 0.1 | 0.2 | 0.5 | 0.1 | 0.2 | 0.5 | 0.1 | 0.2 | 0.5 | 0.05 | 0.083 |
| Fungal Growth After Incubation | | | | | | | | | | | | | | | | | | | | |
| 1. A. niger | | | | | | | | | | | | | | | | | | | | |
| a. Unweathered | | | | | | | | | | | | | | | | | | | | |
| After 1 wk. | 0 | 0 | 0 | 0 | 0 | 0 | 0 | 0 | 0 | 0 | 0 | 0 | 0 | 0 | 0 | 0 | 0 | 0 | 0 | 0 |
| After 2 wks. | 0 | 0 | 0 | 0 | 0 | 0 | 0 | 0 | 0 | 0 | 0 | 0 | 0 | 0 | 0 | 0 | 0 | 0 | 0 | 0 |
| After 3 wks. | 0 | 0 | 0 | 0 | 0 | 0 | 0 | 0 | 0 | 0 | 0 | 0 | 0 | 0 | 0 | 0 | 0 | 0 | 0 | 0 |
| After 4 wks. | 0 | 0 | 0 | 0 | 0 | 0 | 0 | 0 | 0 | Tr | 0 | 0 | 0 | Tr | 0 | 0 | 0 | 0 | 0 | 0 |
| b. Weathered 100 Hrs. | | | | | | | | | | | | | | | | | | | | |
| After 1 wk. | 0 | 0 | 0 | 0 | 0 | 0 | 0 | 0 | 0 | 0 | 0 | 0 | 0 | 0 | — | — | — | — | ZO | ZO |
| After 2 wks. | 0 | 0 | 0 | 0 | 0 | 0 | 0 | 0 | 0 | 0 | 0 | 0 | 0 | 0 | — | — | — | — | ZO | ZO |
| After 3 wks. | 0 | 0 | 0 | Tr | 0 | 0 | 0 | 0 | 0 | Tr | 0 | 0 | 0 | 0 | — | — | — | — | ZO | ZO |
| After 4 wks. | 0 | 0 | 0 | 0 | 0 | 0 | 0 | 0 | 0 | Tr | 0 | 0 | 0 | 0 | — | — | — | — | ZO | ZO |
| 2. Mixture of P. funiculosum and A. niger | | | | | | | | | | | | | | | | | | | | |
| a. Unweathered | | | | | | | | | | | | | | | | | | | | |
| After 1 wk. | 0 | 0 | 0 | 0 | 0 | 0 | 1 | 1 | Tr | 0 | 0 | 0 | 0 | 0 | Tr | 0 | 0 | ZO | ZO | |
| After 2 wks. | Tr | 0 | 0 | Tr | 0 | 0 | 2 | 2 | 1 | Tr | 0 | 0 | 1 | 0 | 0 | 1 | Tr | 0 | ZO | ZO |
| After 3 wks. | 1 | 0 | 0 | 1 | 0 | 0 | 3 | 3 | 2 | 1 | 0 | 0 | 2 | Tr | 0 | 2 | 1 | Tr | ZO | ZO |
| After 4 wks. | 2 | Tr | 0 | 2 | Tr | 0 | 4 | 4 | 3 | 3 | 1 | 0 | 3 | 1 | ZO | 4 | 2 | 1 | ZO | ZO |
| b. Weathered 100 Hrs. | | | | | | | | | | | | | | | | | | | | |
| After 1 wk. | 1 | Tr | 0 | 1 | 0 | 0 | 2 | 2 | 1 | 1 | Tr | 0 | 0 | Tr | 0 | 1 | Tr | 0 | ZO | ZO |
| After 2 wks. | 3 | 2 | 0 | 2 | 1 | 0 | 3 | 3 | 2 | 2 | 1 | Tr | 1 | 1 | 0 | 2 | 1 | Tr | ZO | ZO |
| After 3 wks. | 4 | 3 | 1 | 4 | 2 | Tr | 4 | 4 | 3 | 3 | 2 | 1 | 2 | 2 | Tr | 4 | 2 | 1 | ZO | ZO |
| After 4 wks. | 4 | 4 | 1 | 4 | 3 | 1 | 4 | 4 | 3 | 4 | 4 | 2 | 4 | 3 | 1 | 4 | 2 | 1 | ZO | ZO |
| c. Weathered 200 Hrs. | | | | | | | | | | | | | | | | | | | | |
| After 1 wk. | — | — | 0 | — | 1 | 0 | — | — | — | — | 1 | 0 | — | 1 | 0 | 2 | 1 | 0 | ZO | ZO |
| After 2 wks. | — | — | 1 | — | 3 | 1 | — | — | — | — | 2 | 1 | — | 3 | Tr | 3 | 2 | Tr | ZO | ZO |
| After 3 wks. | — | — | 2 | — | 4 | 2 | — | — | — | — | 4 | 2 | — | 4 | 1 | 4 | 3 | 1 | ZO | ZO |
| After 4 wks. | — | — | 3 | — | 4 | 3 | — | — | — | — | 4 | 3 | — | 4 | 2 | 4 | 3 | 1 | ZO | ZO |
| 3. S. reticulum | | | | | | | | | | | | | | | | | | | | |
| a. Unweathered | | | | | | | | | | | | | | | | | | | | |
| After 1 wk. | ZO | ZO | ZO | ZO | ZO | ZO | 1 | Tr | Tr | 1 | 1 | 1 | 2 | 1 | 1 | 2 | 2 | 1 | ZO | ZO |
| After 2 wks. | ZO | ZO | ZO | ZO | ZO | ZO | 1 | Tr | Tr | 1 | 2 | 1 | 2 | 1 | Tr | 2 | 2 | 1 | ZO | ZO |
| b. Weathered 100 Hrs. | | | | | | | | | | | | | | | | | | | | |
| After 1 wk. | 0 | 0 | 0 | 0 | 0 | 0 | 1 | 1 | 0 | 0 | 0 | 0 | 1 | Tr | — | — | — | 0 | 0 | 0 |
| After 2 wks. | 0 | Tr | 2 | 1 | 0 | 0 | 2 | 1 | 0 | Tr | 0 | 0 | 1 | Tr | — | — | — | 0 | 0 | 0 |

Each of the other N-(2,6-di-substituted-phenyl)maleimides disclosed herein can be used in a similar manner to protect vinyl halide resin compositions from attack by fungi and bacteria.

What is claimed is:

1. A composition resistant to attack by bacteria and fungi that comprises a vinyl halide resin and from 0.01 to 2 percent, based on the weight of the composition, of a biocidal compound having the structural formula

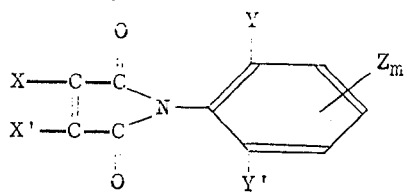

where X and X' each represents hydrogen or halogen; Y and Y' each represents alkyl of 1 to 4 carbon atoms, alkoxy of 1 to 4 carbon atoms, halogen, nitro, or benzyl; Z represents alkyl of 1 to 4 carbon atoms, halogen or nitro; and $m$ represents a number in the range of 0 to 3.

2. A composition as defined in claim 1 that contains 0.25 to 1.5 percent, based on the weight of the composition, of the biocidal compound.

3. A composition as defined in claim 1 wherein the vinyl halide resin is polyvinyl chloride.

4. A composition as defined in claim 1 wherein the biocidal compound has the structural formula

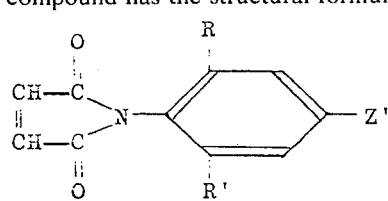

wherein R and R' each represents alkyl of 1 to 4 carbon atoms, chlorine, or bromine and Z' represents hydrogen, alkyl of 1 to 4 carbon atoms, chlorine, or bromine.

5. A composition as defined in claim 4 wherein the biocidal compound is N-2,6-dimethylphenylmaleimide.

6. A composition as defined in claim 4 wherein the biocidal compound is N-(2-methyl-6-ethylphenyl)maleimide.

7. A composition as defined in claim 4 wherein the biocidal compound is N-2,6-diethylphenylmaleimide.

8. A composition as defined in claim 4 wherein the biocidal compound is N-2,6-diisopropylphenylmaleimide.

9. A composition as defined in claim 4 wherein the biocidal compound is N-(2-methyl-6-chlorophenyl)maleimide.

10. The method of controlling the growth of fungi and bacteria in vinyl halide resin compositions that comprises incorporating in said compositions 0.01 to 2 percent by weight of a biocidal compound having the structural formula

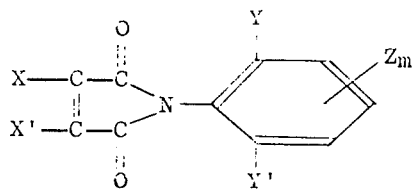

wherein X and X' each represents hydrogen or halogen; Y and Y' each represents alkyl of 1 to 4 carbon atoms, alkoxy of 1 to 4 carbon atoms, halogen, nitro, or benzyl; Z represents alkyl of 1 to 4 carbon atoms, halogen, or nitro; and $m$ represents a number in the range of 0 to 3.

11. The method of claim 10 wherein the vinyl halide resin is polyvinyl chloride.

12. The method of claim 10 wherein 0.25 to 1.5 percent by weight of the biocidal compound is incorporated in said compositions.

13. The method of claim 10 wherein the biocidal compound has the structural formula

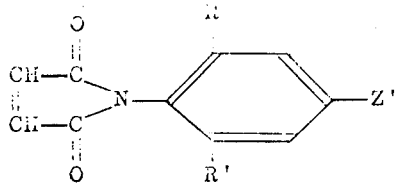

wherein R and R' each represents alkyl of 1 to 4 carbon atoms, chlorine, or bromine and Z' represents hydrogen, alkyl of 1 to 4 carbon atoms, chlorine, or bromine.

14. The method of claim 13 wherein the biocidal compound is N-2,6-dimethylphenylmaleimide.

15. The method of claim 13 wherein the biocidal compound is N-(2-methyl-6-ethylphenyl)maleimide.

16. The method of claim 13 wherein the biocidal compound is N-2,6-diethylphenylmaleimide.

17. The method of claim 13 wherein the biocidal compound is N-2,6-diisopropylphenylmaleimide.

18. The method of claim 13 wherein the biocidal compound is N-(2-methyl-6-chlorophenyl)maleimide.

19. The method of claim 10 wherein the biocidal compound is added as a solution containing 0.5 to 5.0 percent of the N-(2,6-di-substituted-phenyl)maleimide.

* * * * *